United States Patent [19]

Suzuki et al.

[11] Patent Number: 5,785,140

[45] Date of Patent: Jul. 28, 1998

[54] VEHICULAR VIBRATION ISOLATING APPARATUS

[75] Inventors: Takehiro Suzuki; Masamitsu Matsuura, both of Hamamatsu, Japan

[73] Assignee: Suzuki Motor Corporation, Shizuoka-ken, Japan

[21] Appl. No.: 582,196

[22] Filed: Jan. 2, 1996

[30] Foreign Application Priority Data

Jan. 17, 1995 [JP] Japan ................................. 7-022301
Jan. 17, 1995 [JP] Japan ................................. 7-022307

[51] Int. Cl.[6] ................................. B60K 11/04
[52] U.S. Cl. ................. 180/68.4; 267/136; 165/67
[58] Field of Search ................. 267/33, 136, 137, 267/139, 140.3, 140.4, 140.13, 151, 141–141.4, 293; 248/232, 233, 635; 180/68.4; 165/67, 69; 296/188, 194

[56] References Cited

U.S. PATENT DOCUMENTS

| 3,248,076 | 4/1966 | Ferguson | 180/68.4 |
|---|---|---|---|
| 3,270,998 | 9/1966 | Keetah | 267/140.3 |
| 4,519,467 | 5/1985 | Saunders | 165/67 |
| 4,564,168 | 1/1986 | Ikuta et al. | 180/68.4 |
| 4,651,839 | 3/1987 | Isobe | 180/68.4 |
| 5,544,714 | 8/1996 | May et al. | 180/68.4 |

FOREIGN PATENT DOCUMENTS

| 105133 | 9/1938 | Australia | 267/140.4 |
|---|---|---|---|
| 0046566 | 3/1982 | European Pat. Off. | |
| 0 052 291 | 5/1982 | European Pat. Off. | |
| 0132844 | 2/1985 | European Pat. Off. | |
| 0036723 | 3/1983 | Japan | 180/68.4 |
| 59-90638 | 6/1984 | Japan | |
| 63-43246 | 8/1988 | Japan | |
| 64-330 | 6/1989 | Japan | |
| 0314624 | 12/1989 | Japan | 180/68.4 |
| 3217329 | 9/1991 | Japan | 180/68.4 |
| 4-4336 | 8/1992 | Japan | |
| 1465558 | 2/1977 | United Kingdom | |
| 1545095 | 5/1979 | United Kingdom | |

*Primary Examiner*—Chris Schwartz
*Attorney, Agent, or Firm*—Bell Seltzer Intellectual Property Law Group Alston & Bird, LLP

[57] ABSTRACT

The present invention provides a vehicular vibration isolating apparatus, in which an upper tank of a radiator is carried, via an upper bush of an elastic material, on an upper bracket installed to an upper member on a vehicle body side, and a lower tank of the radiator is carried, via a lower bush of an elastic material, on a lower bracket installed to a lower member on the vehicle body side. In addition, gaps are formed between the upper bracket and the upper bush, and a spring for elastically supporting the radiator is installed between the lower tank and the lower bracket. As such, a dynamic damper is formed by means of the radiator, components connected to the radiator, and the spring.

3 Claims, 10 Drawing Sheets

VEHICULAR VIBRATION ISOLATING APPARATUS

FIELD OF THE INVENTION AND RELATED ART STATEMENT

The present invention relates to a vehicular vibration isolating apparatus and, more particularly, to a vehicular vibration isolating apparatus which causes a radiator to function as a dynamic damper under all temperature conditions, accomplishes the damping of a vehicle, keeps the function of dynamic damper for a long period of time, isolates vibration propagated from the upper side of the radiator, reduces the propagation of fan noise and fan vibration to the vehicle body, and achieves a cost reduction by employing a simple construction to restrict a large displacement by using an upper bush on the upper side of the radiator without installing springs on the upper and lower sides of the radiator.

Further, the present invention relates to a vehicular vibration isolating apparatus and, more particularly, to a vehicular vibration isolating apparatus which enhances the assembling property of a lower bush to a lower bracket, eliminates the need for application of an insertion assisting agent and checking process after assembly, achieves a cost reduction, causes the internal space of the lower bush to function as an air damper, contributes to the damping of the vehicle, absorbs and compensates the displacement in the longitudinal direction of the vehicle due to the bending and stretching deformation of an inlet hose of the radiator caused by a change in cooling water temperature, causes the radiator to function as a dynamic damper under all temperature conditions, and accomplishes the damping of the vehicle.

In driving a vehicle, especially when an engine rotates at a low speed, the vibration caused by the rotation of the engine propagates to the vehicle body, resulting in the occurrence of resonance.

Some vehicles are equipped with a vehicular vibration isolating apparatus in which the radiator for the mounted engine is used to form a dynamic damper, by which damping of the vehicle is accomplished. The conventional vehicular vibration isolating apparatuses using a radiator have been disclosed in, for example, Japanese Utility Model Publication No. 64-330 (No. 330/1989), Japanese Patent Provisional Publication No. 4-4336 (No. 4336/1992), Japanese Patent Publication No. 63-43246 (No. 43246/1988), Japanese Utility Model Provisional Publication No. 59-90638 (No. 90638/1984), and Japanese Utility Model Provisional Publication 57-141118 (No. 141118/1982).

The vehicular vibration isolating apparatus disclosed in Japanese Utility Model Publication No. 64-330 (No. 330/1989) is such that a radiator is elastically supported by the vehicle body via a rubber bush, and the vertical spring constant of this rubber bush is set at a value determined from the radiator mass including cooling water and the vertical frequency of the vehicle body in engine idling, by which the resonance of the vehicle body is inhibited.

The vehicular vibration isolating apparatus disclosed in Japanese Patent Provisional Publication No. 4-4336 (No. 4336/1992), Japanese Patent Publication No. 63-43246 (No. 43246/1988), Japanese Utility Model Provisional Publication No. 59-90638 (No. 90638/1984), and Japanese Utility Model Provisional Publication 57-141118 (No. 141118/1982) is such that a radiator is elastically supported via a spring or the like, by which the damping of the vehicle body is accomplished.

However, the vehicular vibration isolating apparatus disclosed in Japanese Utility Model Publication No. 64-330 (No. 330/1989), in which the radiator functions as a dynamic damper, has a problem in that the change in the spring constant of the rubber bush with temperature is great because the spring constant of the rubber bush elastically supporting the radiator is set at a value for inhibiting the resonance of the vehicle body.

For this reason, in the vehicular vibration isolating apparatus disclosed in Japanese Utility Model Publication No. 64-330 (No. 330/1989), as shown in FIG. 14, the radiator is caused to function as a dynamic damper (D) at ordinary temperature (A), by which a vibration isolating effect is achieved (E). On the other hand, the resonance frequency of the dynamic damper changes at low temperatures (B). Therefore, at low temperatures, the radiator not only does not function as a dynamic damper but also has an adverse effect (C). In FIG. 14, curve A denotes the radiator vibration at ordinary temperature, and curve B denotes the radiator vibration at a low temperature. For curve B, the rubber hardens, so that the resonance frequency increases. Curve C denotes the vehicle body vibration at a low temperature. For curve C, an effect of radiator resonance is added to the ordinary vibration, so that the radiator not only has no dynamic damper effect but also sometimes has an adverse effect. Curve D denotes the vehicle body vibration in the case where the radiator functions as a dynamic damper at ordinary temperature. Curve E denotes the vehicle vibration in the case where the radiator does not function as a dynamic damper. Reference character F denotes a region of radiator dynamic damper effect.

The rubber bush is subjected to permanent deformation due to deterioration with age caused by repeated vibrations, thermal effect, or the like. Therefore, it is difficult for the rubber bush to keep the function of dynamic damper for a long period of time.

Contrarily, the vehicle vibration isolating apparatus disclosed in Japanese Patent Provisional Publication No. 4-4336 (No. 4336/1992) and other three publications, in which the radiator functions as a dynamic damper, has less temperature dependence, though the rubber bush has great temperature dependence. However, in the apparatus of this type, not only springs are installed on the upper and lower sides of the radiator, but also a stopper mechanism is needed to restrict a large displacement of the radiator, which leads to an increase in cost, and requires a space for installing the stopper mechanism.

In some vehicular vibration isolating apparatuses in which a dynamic damper is formed by the radiator of the engine, an upper tank of the radiator is carried, via an upper bush of an elastic material, on an upper bracket installed to an upper member on the vehicle body side, and a lower tank of the radiator is carried, via a lower bush of an elastic material, on a lower bracket installed to a lower member on the vehicle body side.

For the aforementioned radiator, after the lower bush is assembled to the lower tank, the lower bush is engaged with an engagement hole on the lower bracket side of the lower bracket installed to the lower member on the vehicle body side on the assembly line of the vehicle.

When the lower bush is engaged with the lower bracket, the lower bush is sometimes engaged with the engagement hole on the lower bracket side with some positional shift. In such a case, the lower part of the lower bush is pressed and deformed by the lower bracket around the engagement hole on the lower bracket side, which produces burrs. Therefore, the lower bush cannot be engaged with the lower bracket in a regular form.

For this reason, in the conventional vehicular vibration isolating apparatus, the need for alignment of the lower bush and the engagement hole on the lower bracket side of the lower bracket reduces the assembling property. Also, the need for application of an insertion assisting agent for preventing burrs to the engagement hole on the lower bracket side and the need for a checking process for checking for the presence of burrs after assembly increase the cost.

Further, when the engine changes from a cold state to a warm state, the internal pressure of the cooling water circuit in the radiator increases with the increase in cooling water temperature. This increase in internal pressure deforms an inlet hose connected to the upper tank of the radiator from a curved form to a straight form. The bending and stretching deformation of the inlet hose between a curved form and a straight form caused by a change in cooling water temperature displaces the upper side of the radiator in the longitudinal direction of the vehicle.

Accordingly, in the conventional vehicular vibration isolating apparatus in which a dynamic damper is formed by the radiator, when the upper tank of the radiator is carried with a gap being formed between the upper bracket installed to the upper member on the vehicle body side and the upper bush of an elastic material, the radiator is displaced in the longitudinal direction of the vehicle by the bending and stretching deformation of the inlet hose caused by a change in cooling water temperature, which-eliminates the gap between the upper bracket and the upper bush, so that the upper bush is caused to abut against the upper bracket in a pressed condition.

As a result, the conventional vehicular vibration isolating apparatus has a disadvantage in that the function as a dynamic damper is impaired in the temperature range other than the set cooling water temperature, and also has a disadvantage in that the radiator cannot function as a dynamic damper under all temperature conditions.

OBJECT AND SUMMARY OF THE INVENTION

Accordingly, the present invention was made to solve the above problem. The present invention provides a vehicular vibration isolating apparatus, in which an upper tank of a radiator is carried, via an upper bush of an elastic material, on an upper bracket installed to an upper member on the vehicle body side, a lower tank of the radiator is carried, via a lower bush of an elastic material, on a lower bracket installed to a lower member on the vehicle body side, gaps are formed between the upper bracket and the upper bush, and a spring for elastically supporting the radiator is installed between the lower tank and the lower bracket, by which a dynamic damper is formed by means of the radiator, components connected to the radiator, and the spring.

According to the present invention, the vehicular vibration isolating apparatus forms a dynamic damper by installing a spring only between the lower tank and the lower bracket on the lower side of the radiator. Therefore, the vehicular vibration isolating apparatus has less temperature dependence unlike the conventional rubber bush and is simple in construction. Also, since gaps are formed between the upper bracket and the upper bush on the upper side of the radiator, the vehicular vibration isolating apparatus can isolate the vibration propagated from the upper side while restricting a large displacement of the radiator by means of the upper bush.

As described above, according to the present invention, the vehicular vibration isolating apparatus has less temperature dependence unlike the conventional rubber bush and is simple in construction. Also, it can isolate the vibration propagated from the upper side while restricting a large displacement of the radiator.

Therefore, for the vehicular vibration isolating apparatus, the radiator can function as a dynamic damper in all temperature conditions by using a spring installed only on the lower side of the radiator, so that the damping of the vehicle can be achieved, and the function of dynamic damper can be kept for a long period of time. The simple construction of the vehicular vibration isolating apparatus can achieve a cost reduction. Also, the vehicular vibration isolating apparatus can reduce the propagation of fan noise and fan vibration to the vehicle body side by isolating the vibration propagated from the upper side. Further, the vehicular vibration isolating apparatus can achieve a cost reduction by using a simple construction to restrict a large displacement by means of the upper bush on the upper side of the radiator without installing springs on the upper and lower sides of the radiator.

Another embodiment of the present invention provides a vehicular vibration isolating apparatus, in which an upper tank of a radiator is carried, via an upper bush of an elastic material, on an upper bracket installed to an upper member on the vehicle body side, a lower tank of the radiator is carried, via a lower bush of an elastic material, on a lower bracket installed to a lower member on the vehicle body side, gaps are formed between the upper bracket and the upper bush, and a spring for elastically supporting the radiator is installed between the lower tank and the lower bracket, by which a dynamic damper is formed by means of the radiator, components connected to the radiator, and the spring, characterized in that the lower bush is provided with an internal space such as to contain the spring, a seal member is installed on the lower face of the lower bush so as to close the internal space, and the seal member has an antifriction surface having a low coefficient of friction on the side in contact with the lower bracket.

According to the configuration of the present invention, the vehicular vibration isolating apparatus has the lower bush in which the internal space is formed so as to contain the spring for elastically supporting the radiator, and the seal member is installed on the lower face of the lower bush so as to close the internal space. Therefore, the lower bush can be formed into a closed shape, so that the rigidity can be increased. Since the seal member has the antifriction surface having a low coefficient of friction on the side in contact with the lower bracket, the lower bush can be engaged smoothly even if some positional shift occurs between the lower bracket and the lower bush in engagement, so that the need for strict alignment of the lower bush and the lower bracket can be eliminated.

As described above, according to the present invention, for the vehicular vibration isolating apparatus, the lower bush can be formed into a closed shape by means of the seal member, thereby increasing the rigidity, and also the lower bush can be engaged smoothly by means of the antifriction surface of the seal member even if some positional shift occurs between the lower bracket and the lower bush in engagement, so that the need for strict alignment of the lower bush and the lower bracket can be eliminated.

Therefore, the vehicular vibration isolating apparatus can enhance the assembling property of the lower bush to the lower bracket, and eliminates the need for application of an insertion assisting agent and checking process after assembly, thereby achieving a cost reduction. Also, for the vehicular vibration isolating apparatus, since the small-diameter communicating hole for communicating the internal space with the external space is formed in the seal member for closing the internal space in the lower bush, the internal space in the lower bush can be used as an air damper, which contributes to the damping of the vehicle. Further, for the vehicular vibration isolating apparatus, since the gaps between the upper bracket and the upper bush are formed so that the gap in the longitudinal direction of the vehicle is larger, the displacement of the radiator in the longitudinal direction of the vehicle due to the bending and stretching deformation of the inlet hose of the radiator caused by a change in cooling water temperature can be absorbed and compensated. Therefore, the radiator can function as a dynamic damper in all cooling water temperature conditions, so that the damping of the vehicle can be achieved.

DETAILED DESCRIPTION OF PREFERRED EMBODIMENTS

Figure 3:
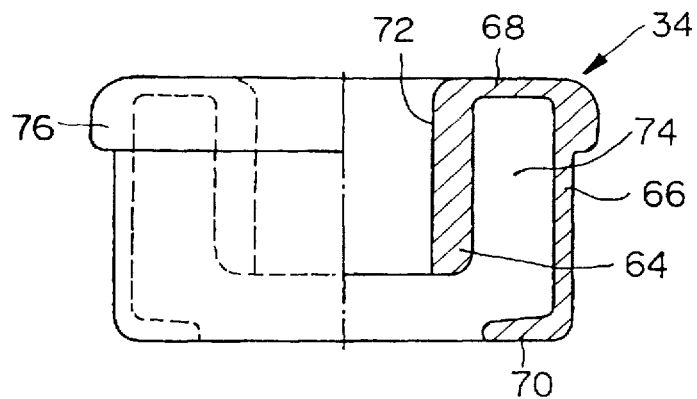
FIG. 3 is a side view, sectioned on the right half, of a lower bush.
Figure 4:
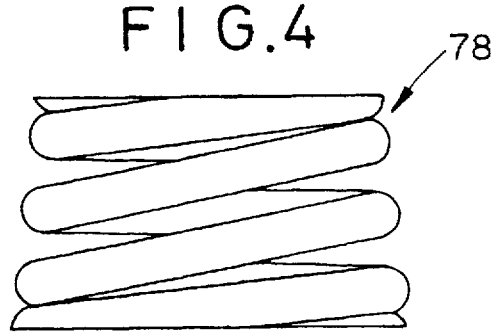
FIG. 4 is a side view of a spring.
Figure 5:
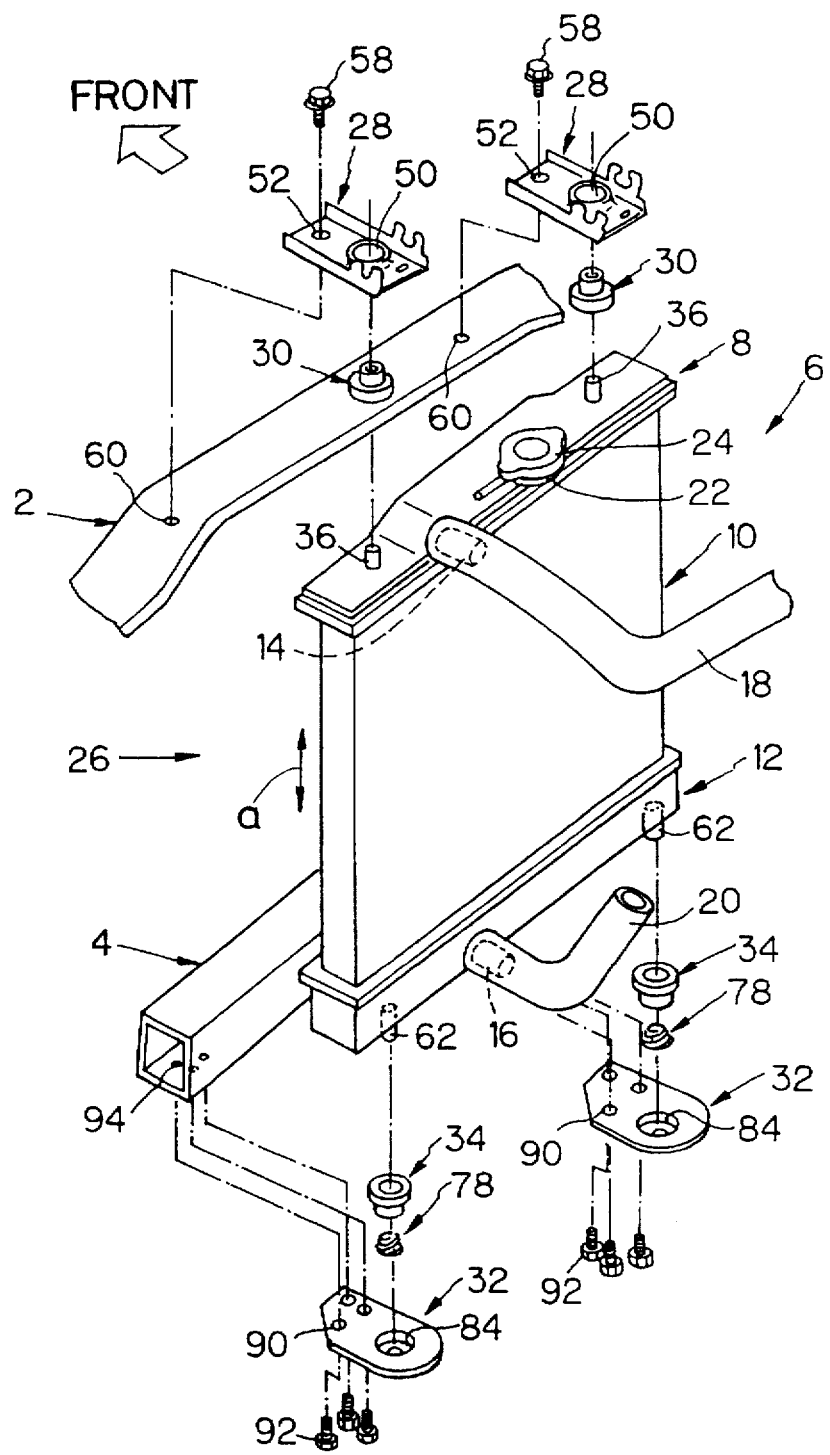
FIG. 5 is an exploded perspective view of a vehicular vibration isolating apparatus.
Figure 6:
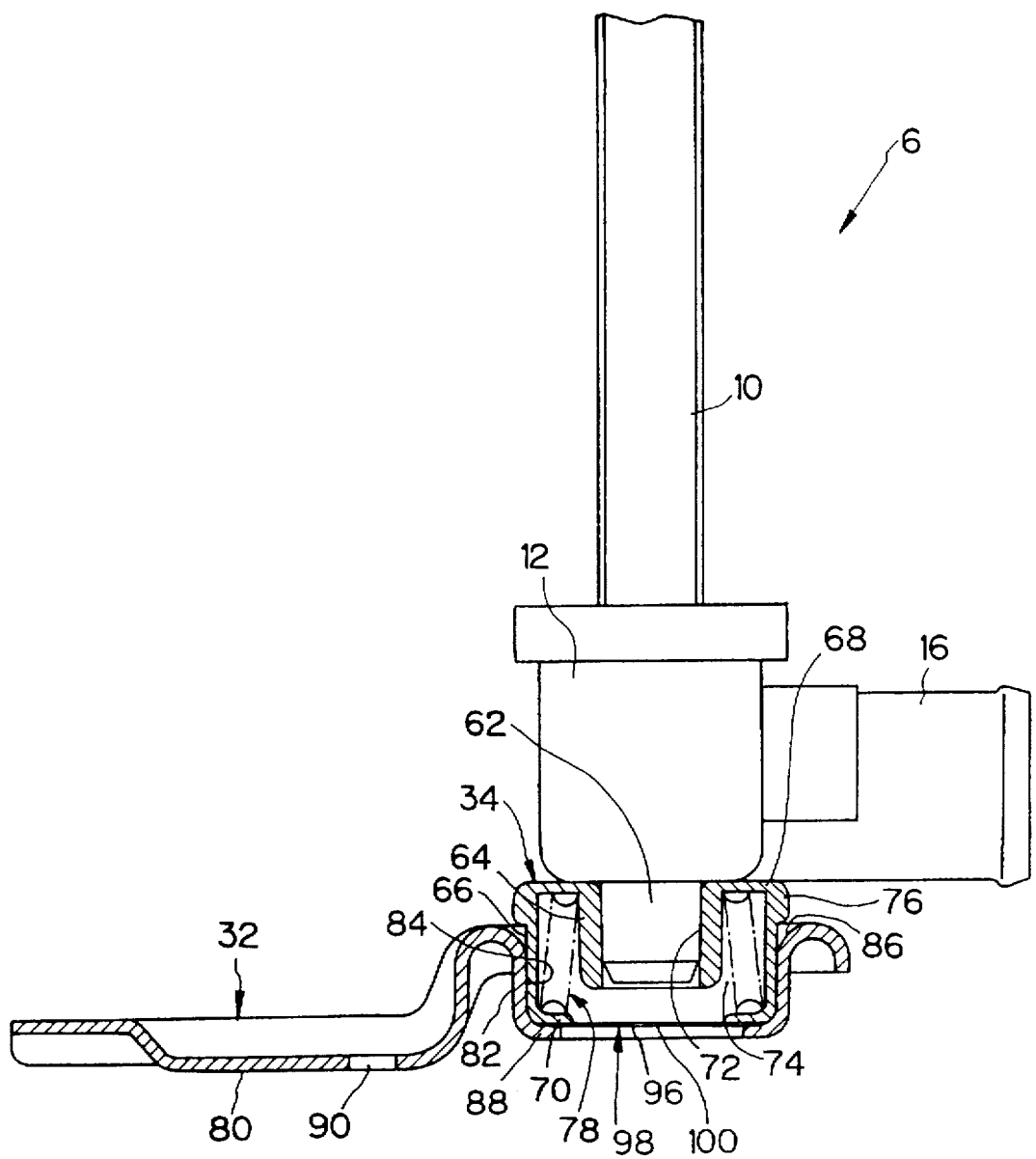
FIG. 6 is a sectional view of a lower tank portion of a radiator for a vehicular vibration isolating apparatus, showing another embodiment of the present invention.

Embodiments of the present invention will be described with reference to the drawings. FIGS. 1 to 5 show an embodiment of the present invention. In FIG. 5, reference numeral 2 denotes an upper member on the vehicle body side of a vehicle (not shown), 4 denotes a lower member on the vehicle body side, 6 denotes a radiator, 8 denotes an upper tank, 10 denotes a core, and 12 denotes a lower tank. Arrow a denotes the vibration direction.

The radiator 6 is provided with an inlet pipe 14 for introducing cooling water from an engine (not shown) to an upper tank 8 and an outlet pipe 16 for supplying cooling water from the lower tank 12 to the engine. To each of the inlet pipe 14 and the outlet pipe 16, one end of an inlet hose 18 and an outlet hose 20 are connected, respectively. The upper tank 8 is provided with a resupply port 22, and a cap 24 is detachably installed to the resupply port 22.

A vehicular vibration isolating apparatus 26 using the radiator 6 is provided by carrying, via upper bushes 30 of an elastic material, the upper tank 8 of the radiator 6 on upper brackets 28 installed to the upper member 2 on the vehicle body side and by carrying, via lower bushes 34 of an elastic material, the lower tank 12 of the radiator 6 on lower brackets 32 installed to the lower member 4 on the vehicle body side.

Figure 2:
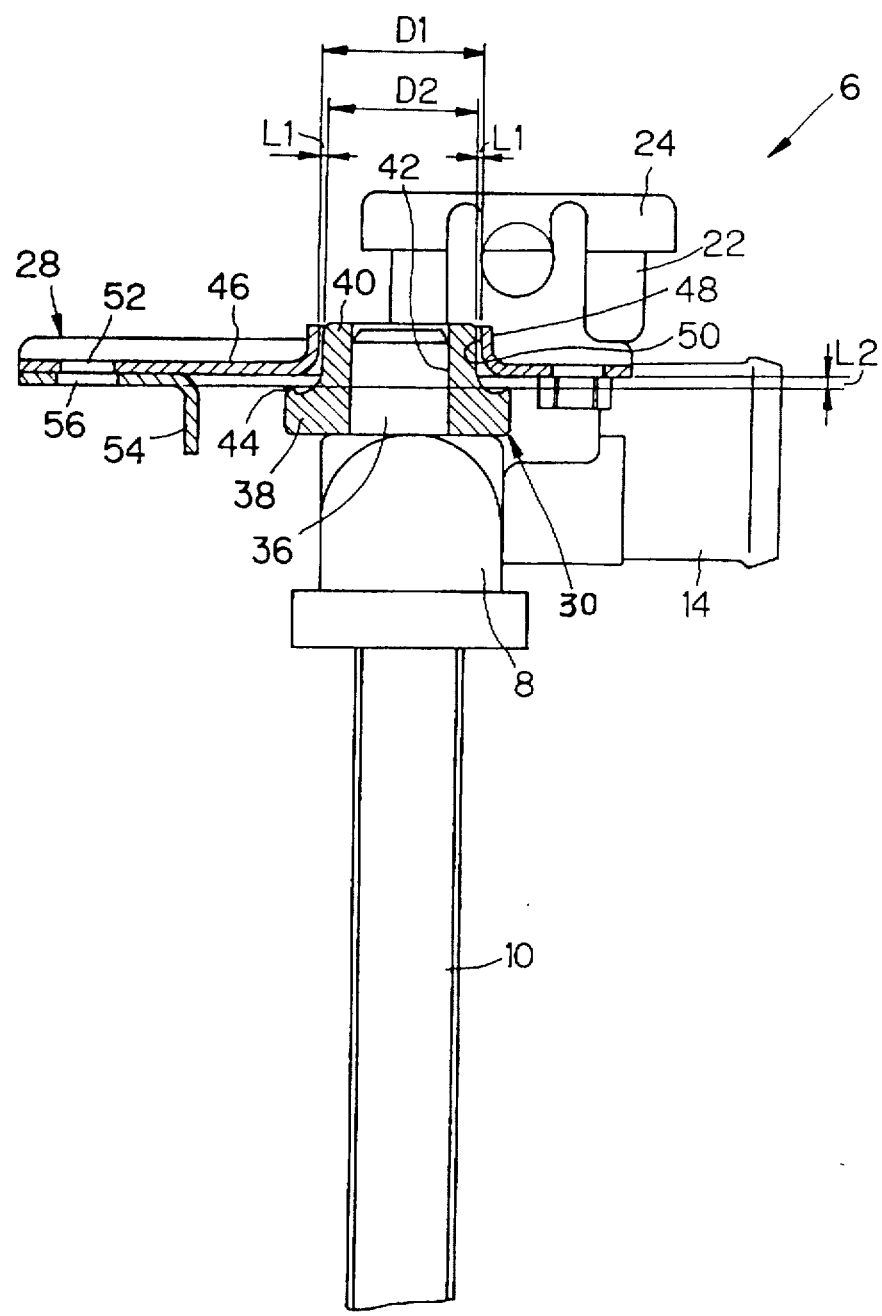
FIG. 2 is a sectional view of an upper tank portion of a radiator.

On the upper face of the upper tank 8, upper fitting shafts 36 are provided. The upper bush 30 is fitted onto the upper fitting shaft 36. As shown in FIG. 2, the upper bush 30 is formed into a substantially stepped cylindrical shape with a large-diameter portion 38 close to the upper face of the upper tank 8 and a small-diameter portion 40 apart from the upper face. Inside the upper bush 30, an upper fitting hole 42, to which the upper fitting shaft 36 is fitted, is formed. At an outer peripheral edge of the large-diameter portion 38, a lip 44 protruding in the direction toward the upper bracket 28 is provided.

The upper bracket 28 has an engagement hole 50 on the upper bracket side, which is formed in an upper body 46 by a cylindrical engagement wall 48 on the upper bracket side. The inside diameter D1 of the engagement hole 50 on the upper bracket side is larger than the outside diameter D2 of the small-diameter portion 40 of the upper bush 30. As shown in FIG. 2, the upper bracket 28 and the upper bush 30 are engaged with each other with a gap L1, which is uniform in the circumferential direction, between the inner peripheral surface of the engagement wall 48 on the upper bracket side and the outer peripheral surface of the small-diameter portion 40, and a gap L2 between the lower face of the upper body 46 and the upper end of the lip 44.

The upper bracket 28 also has an installation hole 52 on the upper bracket side formed in the upper body 46. On the lower face of a portion of the upper body 46 at which the installation hole 52 on the upper bracket side is formed, an upper locking member 54 for positioning is provided, and an upper locking member installation hole 56, which aligns with the installation hole 52 on the upper bracket side, is provided. The upper member 2 on the vehicle body side has an installation hole 60 on the upper member side into which an upper attaching bolt 58 for installing the upper bracket 28 is screwed.

Figure 1:
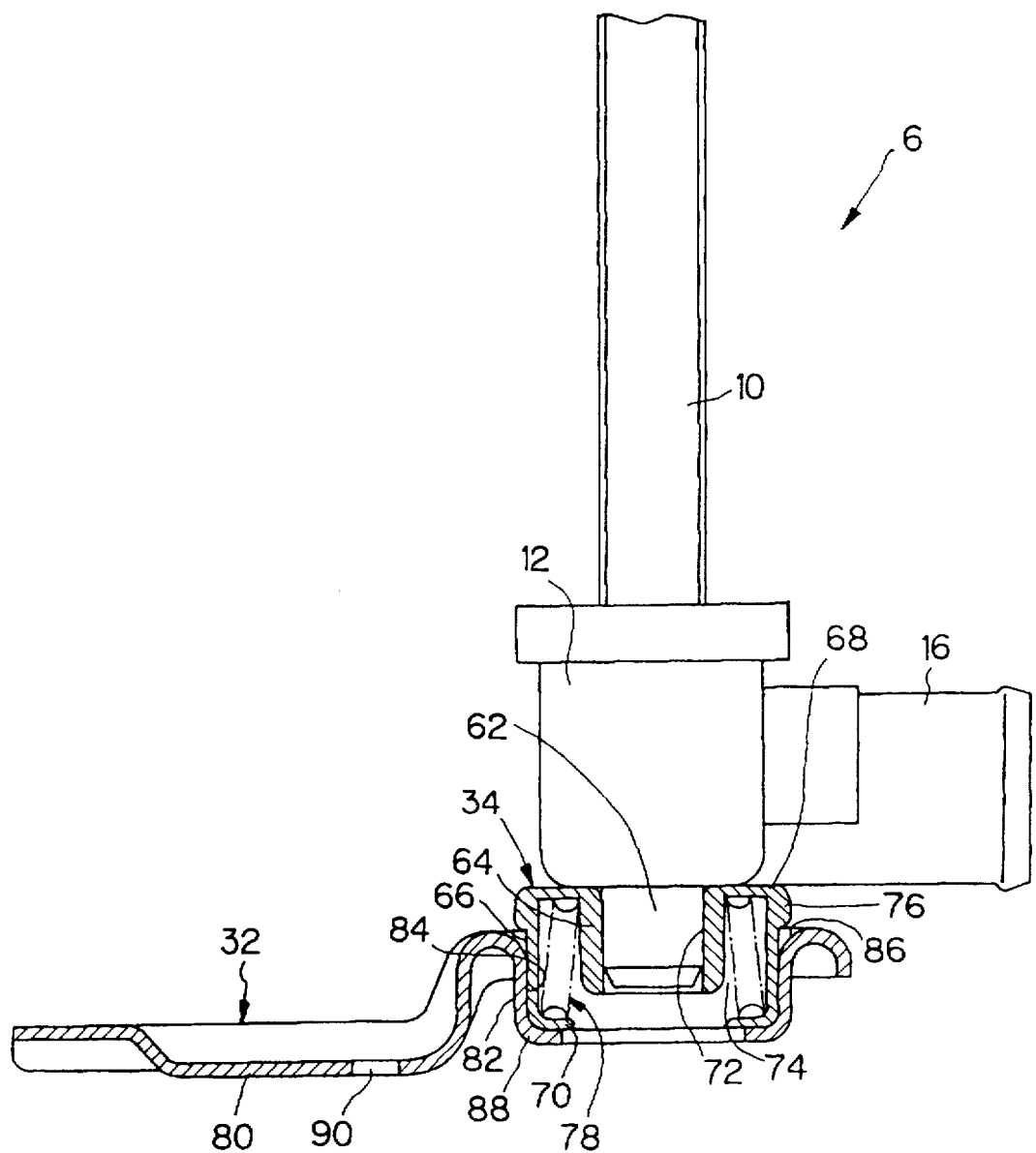
FIG. 1 is a sectional view of a lower tank portion of a radiator for a vehicular vibration isolating apparatus, showing an embodiment of the present invention.

On the lower face of the lower tank 12, a lower fitting shaft 62 is provided. The lower bush 34 is fitted onto the lower fitting shaft 62. As shown in FIGS. 1 and 3, the lower bush 34 is formed into a substantially covered double cylindrical shape by an internal cylindrical portion 64 on the diameter center side, an external cylindrical portion 66 on the radially outer peripheral side, a ring plate shaped connecting portion 68 connecting the upper part of the internal cylindrical portion 64 with the upper part of the external cylindrical portion 66, and a ring plate shaped protruding edge portion 70 protruding from the lower part of the external cylindrical portion 66 in the direction of diameter center.

Inside the internal cylindrical portion of the lower bush 34, a lower fitting hole 72 is provided to fit a lower fitting shaft 62. Between the internal cylindrical portion 64 and the external cylindrical portion 66, a ring-shaped internal space 74 is provided in such a manner that the upper part is closed by the connecting portion 68 and the lower part is opened by the protruding edge portion 70. The lower bush 34 also has a stopper portion 76 protruding in the radially outward direction at the upper outer periphery of the external cylindrical portion 66.

In the internal space 74 between the internal cylindrical portion 64 and the external cylindrical portion 66 of the lower bush 34, a spring 78 for elastically supporting the radiator 6 is installed. The spring 78 is made of a metallic material such as stainless steel and is formed into a tapered coil shape as shown in FIG. 4. The spring 78 installed in the internal space 74 of the lower bush 34 is covered by the internal cylindrical portion 64 and the external cylindrical portion 66 at the inside and the outside, respectively, and by the connecting portion 68 and the protruding edge portion 70 at the upper and lower side, respectively.

The lower bracket 32 has an engagement hole 84 on the lower bracket side, which is formed in a lower body 80 by a cylindrical engagement wall 82 on the lower bracket side. The inside diameter of the engagement hole 84 on the lower bracket side is substantially equal to the outside diameter of the external cylindrical portion 66 of the lower bush 34. At the upper part of the engagement wall 82 on the lower bracket side, an abutting portion 86 protruding in the radially outward direction is provided, while at the lower part thereof, a ring plate shaped protruding portion 88 protruding in the diameter center direction is provided. The abutting portion 86 abuts against the stopper portion 76 when the radiator 6 is displaced to the maximum, so that the maximum displacement of the radiator 6 is controlled. On the protruding portion 88, the protruding edge portion 70 of the lower bush 34, which is engaged with the engagement hole 84 on the lower bracket side, abuts.

The lower bracket 32 also has an installation hole 90 on the lower bracket side formed in the lower body 80. The lower member 4 on the vehicle body side has an installation hole 94 on the lower member side into which a lower attaching bolt 92 for installing the lower bracket 32 is screwed.

Thereupon, the vehicular vibration isolating apparatus, which has the gaps L1 and L2 between the upper bracket 28 and the upper bush 30, and has a spring 78 installed between the lower tank 12 and the lower bracket 32 to elastically support the radiator, forms a dynamic damper by means of the radiator 6, the inlet hose 18 and the outlet hose 20, which are components connected to the radiator 6, and the spring 78.

Next, the operation will be described.

For this vehicular vibration isolating apparatus 26, the spring 78 is installed in the internal space 74 of the lower bush 34 of the radiator 6, and the lower bush 34 is installed by fitting the lower fitting hole 72 of the internal cylindrical portion 64 onto the lower fitting shaft 62 of the lower tank 12. The lower bracket 32 is installed by screwing the lower attaching bolt 92 inserted in the installation hole 90 on the lower bracket side into the installation hole 94 on the lower member side of the lower member 4 on the vehicle body side.

The radiator 6 is installed by carrying, via the lower bush 34 of an elastic material, the lower tank 12 on the lower bracket 32 installed to the lower member 4 on the vehicle body side, and by engaging the lower bush 34 with the engagement hole 84 on the lower bracket side in the lower bracket 32 installed to the lower member 4 on the vehicle body side.

For the radiator 6, the upper bush 30 is installed by fitting the upper fitting hole 42 onto the upper fitting shaft 36 of the upper tank 8. As shown in FIG. 2, the gap L1 is formed between the engagement wall 48 on the upper bracket side and the small-diameter portion 40, and the gap L2 is formed between the upper body 46 and the lip 44. The upper bracket 28 is installed by engaging the small-diameter portion 40 of the upper bush 30 with the engagement hole 50 on the upper bracket side, by installing the large-diameter portion 38 so as to face the upper body 46, and by screwing the upper attaching bolt 58 inserted in the installation hole 52 on the upper bracket side and the upper locking member installation hole 56 into the installation hole 60 on the upper member side of the upper member 2 on the vehicle body side.

The radiator 6 is installed by carrying, via the upper bush 30 of an elastic material, the upper tank 8 on the upper bracket 28 installed to the upper member 2 on the vehicle body side, and by engaging the small-diameter portion 40 of the upper bush 30 with the engagement hole 50 on the upper bracket side of the upper bracket 28 installed to the upper member 2 on the vehicle body side, with the gap L1 being formed and the gap L2 being formed between the upper body 46 and the lip 44.

Thereupon, the vehicular vibration isolating apparatus, which has the spring 78 installed between the lower tank 12 and the lower bracket 32 to elastically support the radiator, forms a dynamic damper by means of the radiator 6, the inlet hose 18 and the outlet hose 20 connected to the radiator 6, and the spring 78. Therefore, the vehicular vibration isolating apparatus 26 can reduce the resonance of the vehicle body occurring in driving the vehicle, especially in the zone of engine idling. Moreover, the vehicular vibration isolating apparatus 26, which has the spring 78 on the lower side only, is not affected by the temperature condition unlike the conventional rubber bush, and is simple in construction. Under all temperature conditions (for example, −30° C. to 50° C.), the vehicular vibration isolating apparatus 26 can function as a dynamic damper. It can achieve the damping of vehicle vibration, and can keep the function of dynamic damper for a long period of time.

For the vehicular vibration isolating apparatus 26, since the tapered coil shaped spring 78 is installed within the lower bush 34, rubbing on the internal cylindrical portion 64 does not occur, so that the occurrence of a beating noise between the lower tank 12 and the lower bracket 32 can be prevented. When a stainless steel material is used for the spring 78, the occurrence of electrolytic corrosion can be prevented. The lower bush 34 of an elastic material serves to prevent the contamination of the spring 78 installed within the lower bush 34 and to prevent cracks created when the lower tank is made of resin. Also, by installing the stopper portion 76 abutting against the abutting portion 86 of the lower bracket 32, the maximum displacement of the radiator 6 can be controlled.

Further, the vehicular vibration isolating apparatus 26 has gaps between the upper bracket 28 and the upper bush 30 in the longitudinal, lateral, and vertical directions. That is to say, the gap L1 is provided in the radial direction at the outer periphery of the small-diameter portion 40 of the upper bush 30 with respect to the upper bracket 28, and the gap L2 is provided in the height direction of the lip 44 of the upper bush 30. For the vehicular vibration isolating apparatus 26, a lip 44 is installed to the upper bush 30 so as to face the upper body 46 of the upper bracket 28 in order to ease the shock produced when the radiator 6 is displaced greatly.

Therefore, the vehicular vibration isolating apparatus 26 can isolate the vibration propagated from the upper side by means of the gaps L1 and L2 while restricting a large displacement of the radiator 6 by means of the lip 44 of the upper bush 30.

Consequently, the vehicular vibration isolating apparatus 26 can reduce the propagation of fan noise and fan vibration to the vehicle body side by isolating the vibration propagated from the upper side. It has a simple construction in which the spring 78 is installed on the lower side only, without springs installed on both the upper and lower sides of the radiator 6, and a large displacement is restricted by the upper bush 30 on the upper side of the radiator 6, so that the decrease in cost can be achieved.

FIGS. 6 to 13 show another embodiment of the present invention. In this embodiment of the present invention, the same reference numerals are applied to elements which are essentially the same as the elements in the above-described embodiment, and the explanation of the elements are omitted. Only the elements different from those in the above-described embodiment will be described.

Figure 10:
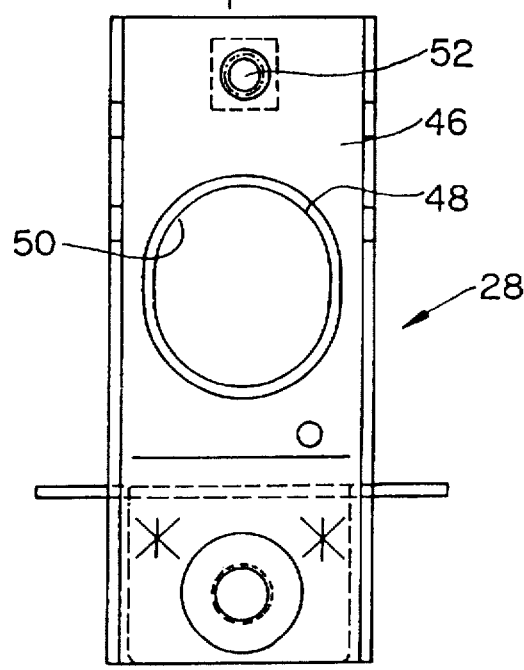
FIG. 10 is a plan view of an upper bracket.
Figure 11:
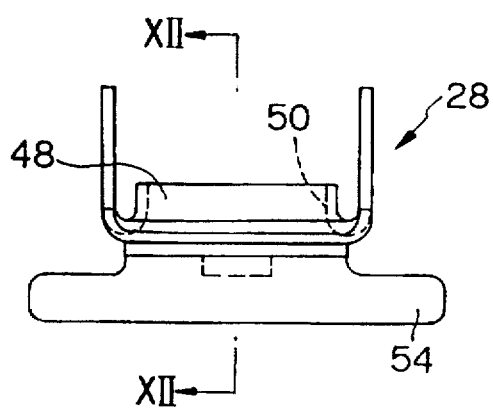
FIG. 11 is a front view of an upper bracket.
Figure 12:
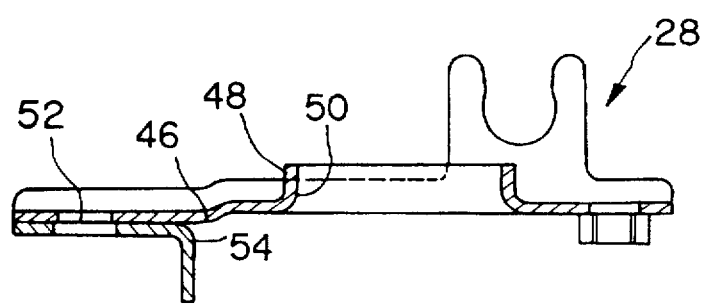
FIG. 12 is a sectional view taken along the line XII—XII of FIG. 11.
Figure 13:
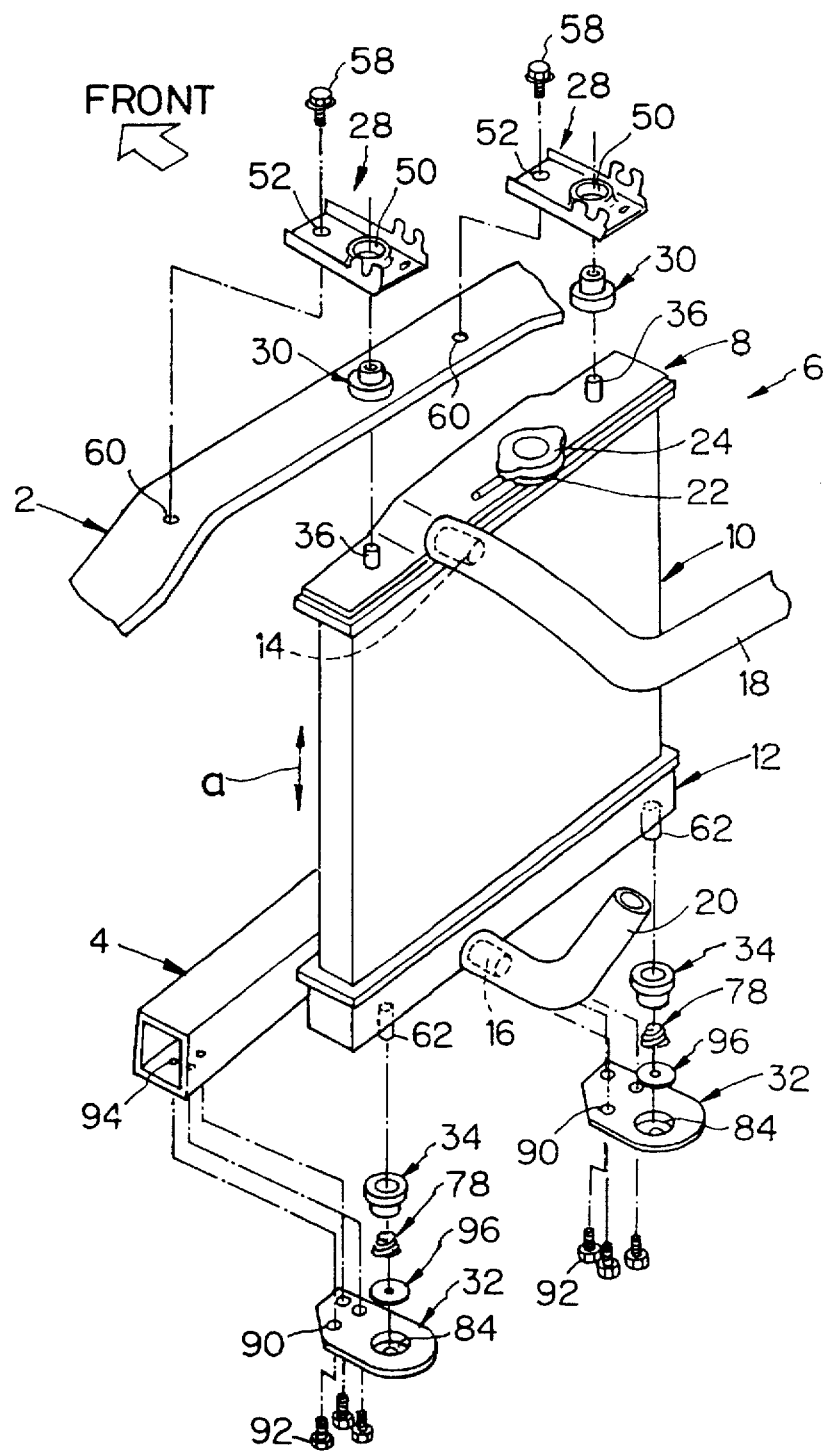
FIG. 13 is an exploded perspective view of a vehicular vibration isolating apparatus.
Figure 14:
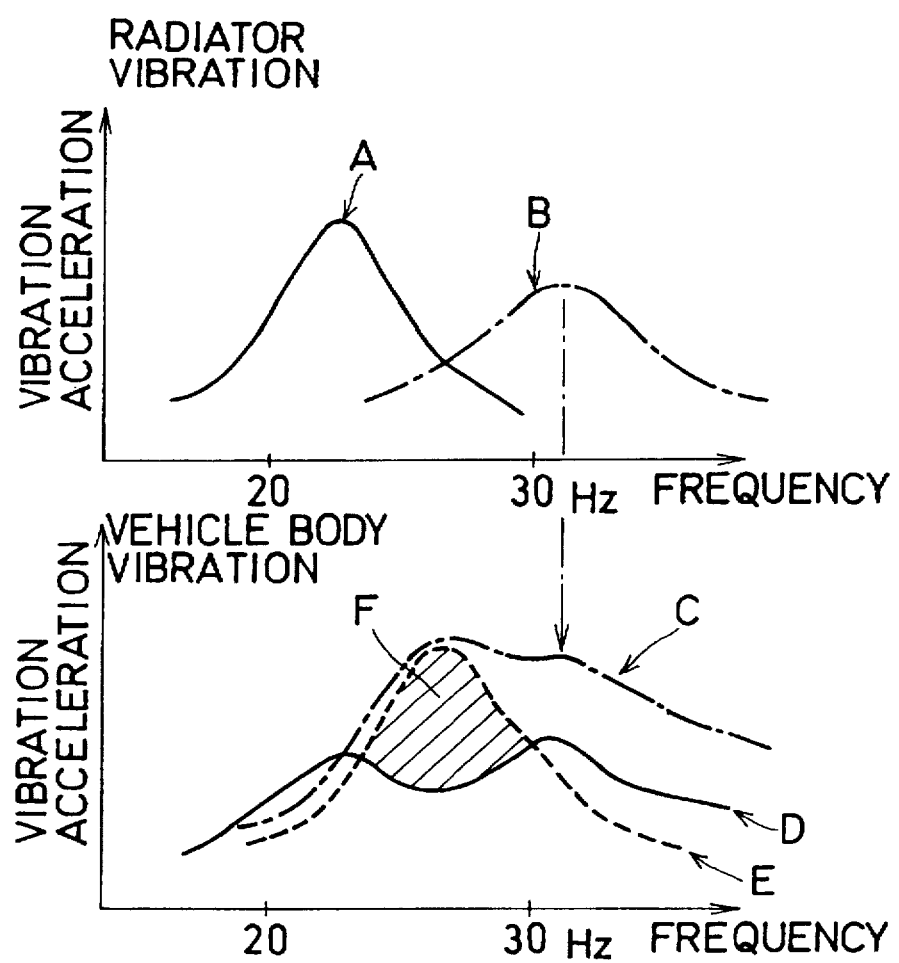
FIG. 14 is a view showing the relationship between frequency and vibration acceleration under temperature conditions for a conventional example.

As shown in FIGS. 10 to 12, the aforementioned upper bracket 28 has an oval engagement hole 50 on the upper bracket side, which is formed in the upper body 46 by an oval engagement wall 48 on the upper bracket side. The engagement hole 50 on the upper bracket side forms an oval having a larger diameter D1 in the longitudinal direction of the vehicle and a smaller diameter D2 in the lateral direction. The smaller diameter D2 of the engagement hole 50 on the upper bracket side is larger than the outside diameter D3 of a small-diameter portion 40 of the upper bush 30.

Figure 7:
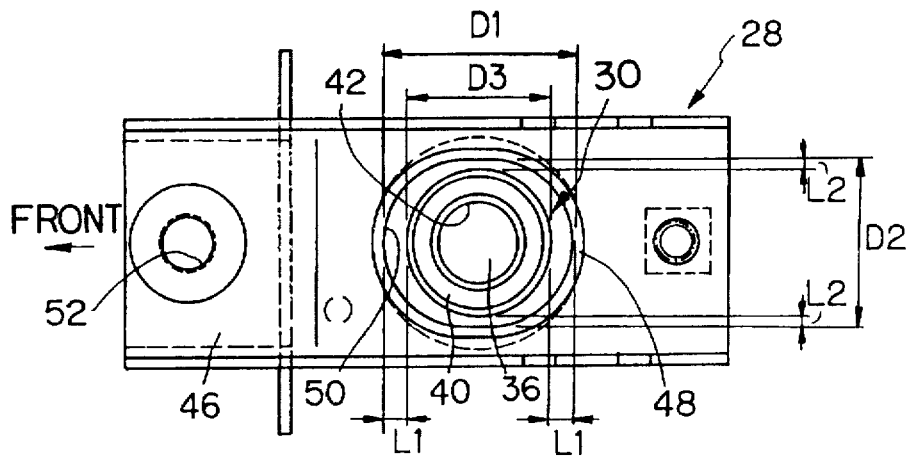
FIG. 7 is a plan view of an upper bracket portion of a radiator upper tank.
Figure 8:
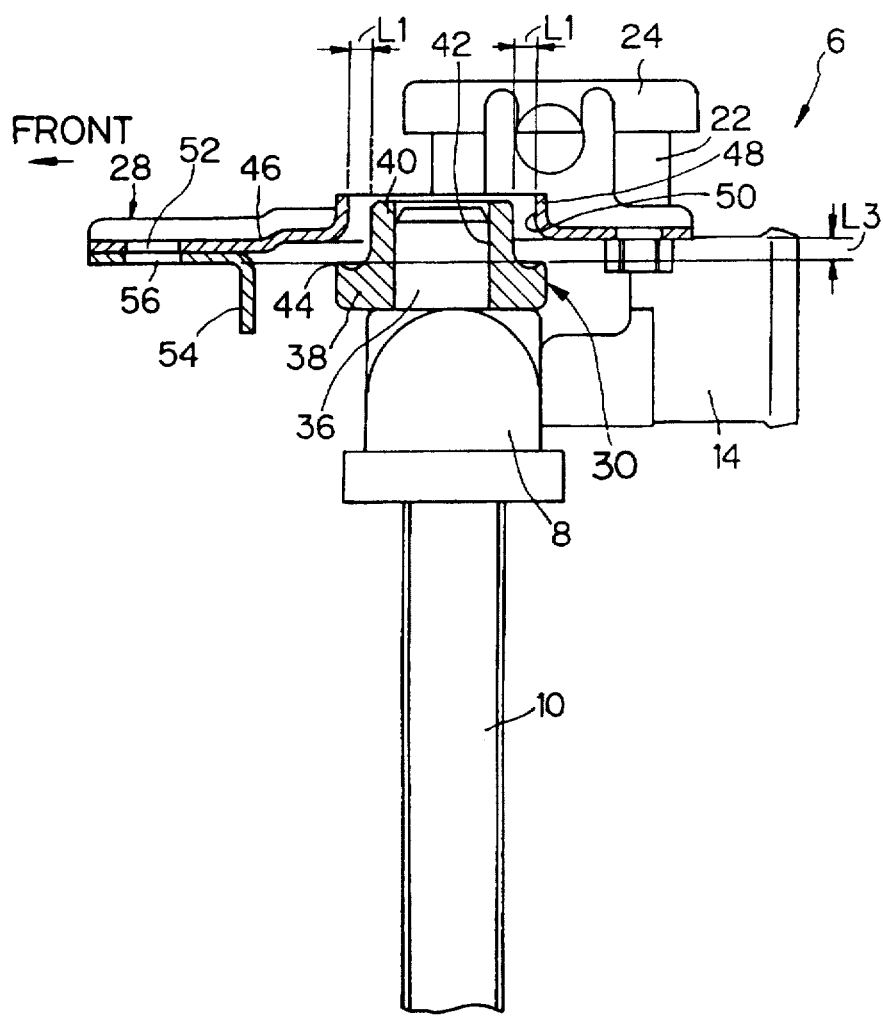
FIG. 8 is a sectional view of an upper tank portion of a radiator.

As shown in FIGS. 7 and 8, the upper bracket 28 and the upper bush 30 are engaged with each other so that a gap L1 between the inner peripheral surface of the engagement wall 48 on the upper bracket side and the outer peripheral surface of the small-diameter portion 40 in the longitudinal direction of the vehicle is formed so as to be larger than a gap L2 in the width direction, and a gap L3 is formed between the lower face of the upper body 46 and the upper end of a lip 44. The larger diameter D1 in the longitudinal direction of the vehicle of the engagement hole 50 on the upper bracket side and the outside diameter D3 of the small-diameter portion 40 are set so that the gap L1 between the upper bracket 28 and the upper bush 30 does not become zero in all temperature ranges (for example, $-30°$ C. to $120°$ C.) of engine cooling water.

Figure 9:
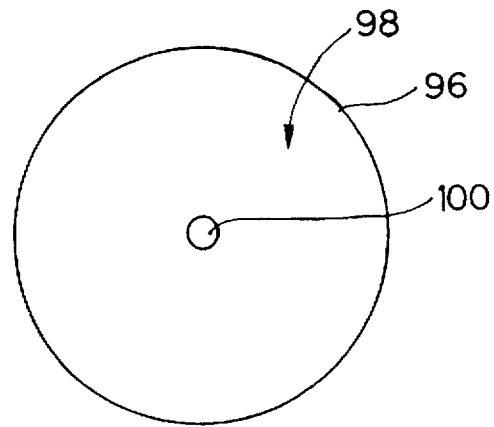
FIG. 9 is a bottom view of a seal member.

The aforementioned lower bush 34 has a seal member 96 on the lower face of the protruding edge portion 70 so as to close the internal space 74. As shown in FIG. 9, the seal member 96 has an antifriction surface 98 having a low coefficient of friction, which is formed on the lower face on the side in contact with the lower bracket 32 by laminating. The seal member 96 also has a small-diameter communicating hole 100 which communicates the internal space 74 of the lower bush with the external space. The seal member 96 is held between the protruding edge portion 70 of the lower bush 34 and the protruding portion 88 of the lower bracket 32 and kept by the engagement of the lower bush 34 with the lower bracket 32.

Next, the operation will be described.

For this vehicular vibration isolating apparatus 26, the spring 78 is installed in the internal space 74 of the lower bush 34 of the radiator 6, the seal member 96 is installed on the lower face of the protruding edge portion 70 so as to close the internal space 74, and the lower bush 34 is installed by fitting the lower fitting hole 72 of the internal cylindrical portion 64 onto the lower fitting shaft 62 of the lower tank 12. The lower bracket 32 is installed by screwing the lower attaching bolt 92 inserted in the installation hole 90 on the lower bracket side into the installation hole 94 on the lower member side of the lower member 4 on the vehicle body side.

The radiator 6 is installed by carrying, via the lower bush 34 of an elastic material, the lower tank 12 on the lower bracket 32 installed to the lower member 4 on the vehicle body side, and by engaging the lower bush 34 with the engagement hole 84 on the lower bracket side in the lower bracket 32 installed to the lower member 4 on the vehicle body side.

For the radiator 6, the upper bush 30 is installed by fitting the upper fitting hole 42 onto the upper fitting shaft 36 of the upper tank 8. As shown in FIGS. 7 and 8, the gaps L1 and L2 are provided between the engagement wall 48 on the upper bracket side and the small-diameter portion 40, and the gap L3 is provided between the upper body 46 and the lip 44. The upper bracket 28 is installed by engaging the small-diameter portion 40 of the upper bush 30 with the engagement hole 50 on the upper bracket side, by installing the large-diameter portion 38 so as to face the upper body 46, and by screwing the upper attaching bolt 58 inserted in the installation hole 52 on the upper bracket side and the upper locking member installation hole 56 into the installation hole 60 on the upper member side of the upper member 2 on the vehicle body side.

The radiator 6 is installed by carrying, via the upper bush 30 of an elastic material, the upper tank 8 on the upper bracket 28 installed to the upper member 2 on the vehicle body side, and by engaging the small-diameter portion 40 of the upper bush 30 with the engagement hole 50 on the upper bracket side of the upper bracket 28 installed to the upper member 2 on the vehicle body side, with the gaps L1 and L2 being formed and the gap L3 being formed between the upper body 46 and the lip 44.

As shown in FIGS. 7 and 8, the upper bracket 28 and the upper bush 30 are engaged with each other so that a gap L1 between the inner peripheral surface of the engagement wall 48 on the upper bracket side and the outer peripheral surface of the small-diameter portion 40 in the longitudinal direction of the vehicle is formed so as to be larger than a gap L2 in the width direction, and a gap L3 is formed between the lower face of the upper body 46 and the upper end of a lip 44.

Thereupon, the vehicular vibration isolating apparatus, which has the spring 78 installed between the lower tank 12 and the lower bracket 32 to elastically support the radiator, forms a dynamic damper by means of the radiator 6, the inlet hose 18 and the outlet hose 20 connected to the radiator 6, and the spring 78. Therefore, the vehicular vibration isolating apparatus 26 achieves the same effect as that of the above-described embodiment of the present invention.

Further, the vehicular vibration isolating apparatus has gaps between the upper bracket 28 and the upper bush 30 in the longitudinal, lateral, and vertical directions. That is to say, the larger gap L1 in the longitudinal direction of the vehicle and the smaller gap L2 in the lateral direction are provided in the radial direction at the outer periphery of the small-diameter portion 40 of the upper bush 30 with respect to the upper bracket 28, and the gap L3 is provided in the height direction of the lip 44 of the upper bush 30. For the vehicular vibration isolating apparatus, a lip 44 is installed to the upper bush 30 so as to face the upper body 46 of the upper bracket 28 in order to ease the shock produced when the radiator 6 is displaced greatly.

Therefore, the vehicular vibration isolating apparatus can isolate the vibration propagated from the upper side by means of the gaps L1, L2 and L3 while restricting a large displacement of the radiator 6 by means of the lip 44 of the upper bush 30.

Consequently, like the above-described embodiment of the present invention, the vehicular vibration isolating apparatus in this embodiment can reduce the propagation of fan noise and fan vibration to the vehicle body side by isolating the vibration propagated from the upper side.

The vehicular vibration isolating apparatus 26, in which the internal space 74 is installed in the lower bush 34 so as to install the spring 78 for elastically supporting the radiator 6, and the seal member 96 is installed on the lower face of the protruding edge portion 70 of the lower bush 34 so as to close the internal space 74, can form the lower bush 34 into a closed shape, thereby increasing the rigidity.

Since the antifriction surface 98 having a low coefficient of friction is provided on the lower face on the side on which the seal member 96 comes in contact with the lower bracket 32, the lower bush 34 can be engaged smoothly even if some positional shift occurs between the lower bracket 32 and the lower bush 34 in engagement. As a result, burrs are not produced at the lower part of the lower bush 34, and the need for strict alignment of the lower bush 34 and the lower bracket 32 can be eliminated.

Therefore, the vehicular vibration isolating apparatus 26 has an enhanced assembling property of the lower bush 34 to the lower bracket 32, and eliminates the need for application of an insertion assisting agent and checking process for checking the presence of burrs after assembly, thereby achieving a cost reduction.

Also, for the vehicular vibration isolating apparatus 26, since the small-diameter communicating hole 100 for communicating the internal space 74 with the external space is formed in the seal member 96 for closing the internal space 74 in the lower bush 34, the small-diameter communicating hole 100 is used as an orifice, so that the internal space 74 in the lower bush 34 can be used as an air damper, which contributes to the damping of the vehicle.

Further, for the vehicular vibration isolating apparatus 26, since the gap L1 in the longitudinal direction of the vehicle and the gap L2 in the lateral direction are formed between the engagement hole 50 on the upper bracket side of the upper bracket 28 and the small-diameter portion 40 of the upper bush 30 so that the gap L1 is larger than the gap L2, the displacement of the radiator 6 in the longitudinal direction of the vehicle due to the bending and stretching deformation of the inlet hose 14 of the radiator 6 caused by a change in cooling water temperature can be absorbed and compensated. Therefore, the radiator 6 can function as a dynamic damper in all cooling water temperature conditions (for example, -30° C. to 120° C.), so that the damping of the vehicle can be achieved.

We claim:

1. A vehicular vibration isolating apparatus, comprising an upper tank of a radiator carried, via an upper bush of an elastic material, on an upper bracket installed to an upper member on a vehicle body side, a lower tank of said radiator carried, via a lower bush of an elastic material, on a lower bracket installed to a lower member on the vehicle body side, gaps formed between said upper bracket and said upper bush, and a spring for elastically supporting said radiator installed between said lower tank and said lower bracket, by which a dynamic damper is formed by means of said radiator, along with said upper bush, said upper bracket, said lower bush, and said lower bracket connected to said radiator, and said spring, wherein said lower bush is provided with an internal space such as to contain said spring, and a seal member installed on the lower face of said lower bush so as to close said internal space, and wherein said seal member has an antifriction surface having a low coefficient of friction on the side in contact with said lower bracket.

2. A vehicular vibration isolating apparatus according to claim 1, wherein said seal member has a communicating hole for communicating said internal space of said lower bush with an external space.

3. A vehicular vibration isolating apparatus according to claim 1, wherein said gaps between said upper bracket and said upper bush are formed so that the circumferential gap in the longitudinal direction of the vehicle is larger.

* * * * *